(12) United States Patent
Connors, Jr. et al.

(10) Patent No.: US 9,334,196 B2
(45) Date of Patent: *May 10, 2016

(54) PAINT COMPOSITION FOR CONCRETE AND MASONRY SURFACES

(71) Applicant: Magneco/Metrel, Inc., Addison, IL (US)

(72) Inventors: Charles W. Connors, Jr., Barrington, IL (US); Michael W. Anderson, West Chicago, IL (US)

(73) Assignee: MAGNECO/METREL, INC., Addison, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/491,233

(22) Filed: Sep. 19, 2014

(65) Prior Publication Data

US 2016/0083306 A1    Mar. 24, 2016

(51) Int. Cl.

| C09D 5/16 | (2006.01) |
|---|---|
| C08K 3/18 | (2006.01) |
| C08K 3/22 | (2006.01) |
| C08G 63/60 | (2006.01) |
| C08L 67/00 | (2006.01) |
| C08L 73/00 | (2006.01) |
| C08L 77/00 | (2006.01) |
| C08G 67/02 | (2006.01) |
| C09D 5/14 | (2006.01) |
| C04B 41/48 | (2006.01) |
| C08K 3/36 | (2006.01) |
| C08K 3/00 | (2006.01) |
| C09D 133/08 | (2006.01) |
| C09D 7/12 | (2006.01) |
| C04B 41/00 | (2006.01) |

(52) U.S. Cl.
CPC ............ *C04B 41/483* (2013.01); *C04B 41/009* (2013.01); *C08K 3/0033* (2013.01); *C08K 3/22* (2013.01); *C08K 3/36* (2013.01); *C09D 7/1216* (2013.01); *C09D 7/1266* (2013.01); *C09D 133/08* (2013.01); C08K 2003/2227 (2013.01); C08K 2003/2248 (2013.01)

(58) Field of Classification Search
None
See application file for complete search history.

(56) References Cited

U.S. PATENT DOCUMENTS

| 5,584,921 A * | 12/1996 | Wagner et al. ............. 106/287.1 |
|---|---|---|
| 6,773,770 B1 | 8/2004 | Sugiyama et al. |
| 8,128,996 B2 * | 3/2012 | Davies et al. ............. 427/372.2 |
| 2004/0058166 A1 | 3/2004 | Nakamura |
| 2005/0210615 A1 | 9/2005 | Shastry et al. |
| 2005/0214720 A1 | 9/2005 | Milanovich et al. |
| 2005/0276923 A1 | 12/2005 | Davies et al. |
| 2007/0140986 A1 | 6/2007 | Prencipe et al. |
| 2007/0269650 A1 | 11/2007 | Leuninger et al. |
| 2007/0272382 A1 | 11/2007 | Becker et al. |
| 2012/0031300 A1 | 2/2012 | Olsen et al. |
| 2012/0294825 A1 * | 11/2012 | Ehara et al. ................ 424/78.09 |

FOREIGN PATENT DOCUMENTS

| EP | 0 952 194 A2 | 10/1999 |
|---|---|---|
| EP | 1 186 637 A1 | 3/2002 |
| EP | 1 299 482 B1 | 8/2006 |
| WO | WO 2013/034158 A1 | 3/2013 |

OTHER PUBLICATIONS

R. Hashemi-Nasab et al., "Effect of Silica Nanoparticles Surface Treatment on In Situ Polymerization of Sytrene-Butyl Acrylate Latex", Progress in Organic Coatings, 2013, v. 7 pp. 1016-1023.

* cited by examiner

*Primary Examiner* — Susannah Chung
*Assistant Examiner* — Robert T Butcher
(74) *Attorney, Agent, or Firm* — Maxwell J. Petersen

(57) ABSTRACT

The present invention is directed to a water-based paint composition for concrete and masonry surfaces, a method of coating a concrete or masonry surface, and a corresponding method of preparing a coated concrete or masonry surface. The paint composition includes about 10-50% by weight water, about 5-40% by weight colloidal silica particles, about 40-85% by weight of an inorganic pigment, and about 1-10% by weight of a polymer binder. The paint composition provides the coated surfaces with excellent resistance to a wide variety of weather conditions, and alleviates health and safety concerns associated with long-term exposure to conventional organic-based paints.

11 Claims, No Drawings

PAINT COMPOSITION FOR CONCRETE AND MASONRY SURFACES

FIELD OF THE INVENTION

This invention is directed to a water-based paint composition designed for application to concrete and masonry surfaces. The paint composition has excellent weathering resistance and anti-fungal properties and alleviates the environmental and health concerns associated with organic-based paint compositions. The invention also includes a method for coating concrete and masonry surfaces, and a method for preparing a coated concrete or masonry surface.

BACKGROUND OF THE INVENTION

Organic-based paint compositions, such as latex paints, have conventionally been used for coating concrete and masonry surfaces. Most of these applications are in outdoor environments, or industrial indoor environments, and require prolonged resistance to extreme environmental conditions. While organic-based latex paints have performed well in these applications, they are relatively expensive due to their predominantly organic chemical compositions. Also, prolonged exposure to latex paints either before coating, or after coating and before drying, raises health and safety concerns especially in indoor environments.

Water-based paint compositions are less expensive and more environmentally safe. However, conventional water-based paint compositions have not provided suitable long-term resistance to weather and other extreme conditions. Also, conventional latex-based and water-based paint compositions can show signs of mold or fungal growth over time, if the applied surfaces are exposed to wet or humid conditions.

There is a need or desire for a relatively inexpensive paint composition that provides long-term resistance to weather and extreme conditions, resists mold and fungal growth, and is free of health and safety concerns.

SUMMARY OF THE INVENTION

The present invention is directed to a water-based paint composition for application to concrete and masonry surfaces. The paint composition generally includes about 10-50% by weight water, about 5-40% by weight colloidal silica particles, about 40-85% by weight of an inorganic pigment, and about 1-10% by weight of a polymer binder. The paint composition may also include about 0.1-5% by weight of an anti-fungal ingredient and about 0.01-2% by weight of a synthetic or natural gum. Suitably, the paint composition does not include more than about 10% by weight of all organic components, inclusive of the polymer binder.

The water-based paint composition has excellent weathering resistance and does not wash away, fade or peel when a coated concrete or masonry surface is exposed long-term to a wide variety of weather conditions. The water-based paint composition also alleviates or avoids the environmental and health concerns associated with long-term exposure and use of organic-based paint compositions.

The invention also includes a method of coating a concrete or masonry surface. The method includes the steps of providing a water-based paint composition including water, colloidal silica particles, and organic pigment and not more than about 10% by weight of a polymer binder; applying the water-based paint composition to a concrete or masonry surface; and evaporating the water from the paint composition. The invention also includes a corresponding method of preparing a coated concrete or masonry surface.

DETAILED DESCRIPTION OF THE INVENTION

The invention is directed to a water-based paint composition that is free of health and safety concerns, environmentally safe, inexpensive, and designed to provide a long-term weather-resistant coating for concrete and masonry surfaces. The paint composition includes about 10-50% by weight water, suitably about 15-40% by weight or about 20-30% by weight. The paint composition also includes about 5-40% by weight colloidal silica particles (based on dry weight), suitably about 10-30% by weight or about 15-25% by weight. The colloidal silica particles are added to the other ingredients of the paint composition as an aqueous colloidal suspension including about 30-50% by weight colloidal silica particles and about 50-70% by weight water, suitably about 40% colloidal silica particles and about 60% by weight water. The water from the colloidal dispersion is counted as part of the overall water content in the paint composition, stated above.

An aqueous colloidal silica suspension is defined as including silica particles with diameters of $10^{-7}$ to $10^{-9}$ meters (about 1-100 nanometers) suspended in a continuous water phase. The mixture has properties between those of a solution and a fine suspension. Colloidal silica particles are defined as silica particles within the colloidal size range, having diameters of about 1-100 nanometers, suitably about 4-100 nanometers, or about 6-50 nanometers, or about 8-20 nanometers.

The paint composition includes about 1-10% by weight of a polymer binder, suitably about 2-8% by weight, or about 2-5% by weight. The polymer binder, which also provides flexibility to the paint composition to prevent peeling, can be a polymer or copolymer of acrylic, acrylamide, vinyl ethers, vinyl esters, urethanes, methacrylates, and epoxy esters. One suitable binder polymer is a styrene-acrylate copolymer available from BASF Chemical Co. under the product name ACRONAL® NX4627X. This product is an aqueous emulsion containing 47-49% by weight styrene-acrylate polymer solids and 51-53% by weight water, the latter being counted as part of the overall water content of the paint composition stated above. Otherwise, the polymer binder can be provided in a mixture including about 35-60% by weight of the polymer binder and about 40-65% by weight of the water.

Because objectives of the paint composition include minimizing cost, health and safety concerns, the total amount of all organic components in the paint composition suitably does not exceed about 10% by weight, including the binder polymer. The binder polymer may be the only organic component.

The paint composition includes about 40-85% by weight of an inorganic pigment, suitably about 45-80% by weight, or about 50-80% by weight. The inorganic pigment is suitably in the form of very fine particles having diameters of about 0.1-100 microns, suitably about 0.2-70 microns. Suitable inorganic pigments include without limitation aluminum oxide, silicon oxide, titanium dioxide, zinc oxide, iron oxide, graphite, antimony oxide, chromium oxide, cobalt aluminum oxide, zinc sulfide, sodium aluminum sulfosilicates, cuprous oxide, and combinations thereof.

The paint composition may include an anti-fungal ingredient, suitably in an amount of about 0.1-5% by weight, or about 0.5-2.5% by weight. Anti-fungal agents prevent or inhibit mold growth resulting from lengthy exposure to wet or humid conditions. One suitable antifungal ingredient is cuprous oxide, sold by American Chemet Corporation under the name LOLO TINT 97. Other suitable anti-fungal ingredients include without limitation zinc oxide, cuprous sulfide, copper hydroxide, copper metal, and combinations thereof. A wide variety of known organic anti-fungal ingredients can be used, but are less desirable due to the objective of minimizing the organic components in the paint composition. Some of the inorganic pigments (e.g. cuprous oxide and zinc oxide) may serve as the anti-fungal ingredient and, if used as pigments, are present in sufficient amounts.

The paint composition may include about 0.01-2% by weight, suitably about 0.01-1% by weight, of a synthetic or natural gum which is water-soluble and serves as a thickening agent to help maintain the solid ingredients in suspension. Suitable gums include without limitation xanthan gum, guar gum, alginates, locust bean gum, and combinations thereof.

In addition to minimizing the total amount of organic components, suitably to about 10% by weight or less, it is also desirable to minimize all other ingredients that might affect health, safety or environmental concerns. For example, the paint composition should be substantially free, or totally free of Group I and Group II metal oxides.

The present invention also includes a method of coating a concrete or masonry surface. The method includes the steps of providing a water-based paint composition which includes the ingredients stated above in any of the amounts stated above. The paint composition includes water, colloidal silica particles, an inorganic pigment, and a polymer binder which constitutes not more than about 10% by weight of the paint composition. The method includes the steps of applying the water-based paint composition to a concrete or masonry surface, and evaporating the water from the paint composition.

The present invention also includes a method of preparing a coated concrete or masonry surface. The method includes the steps of providing a concrete or masonry surface, providing a water-based paint composition having the foregoing described ingredients in the foregoing amounts, applying the water-based paint composition to the concrete or masonry surface, and evaporating the water from the paint composition. The water-based paint composition may include about 10-50% by weight water, about 5-40% by weight colloidal silica particles, about 40-85% by weight of an inorganic pigment, and about 1-10% by weight of a polymer binder.

Expressed another way, the method of preparing a coated concrete or masonry surface includes the steps of providing a concrete or masonry surface, coating the concrete or masonry surface with a water-based paint composition, and evaporating water from the paint composition to dry the paint composition. The paint composition includes water, colloidal silica particles, an inorganic pigment and a polymer binder (suitably a styrene-acrylate polymer binder) in any of the amounts described above, and may contain other ingredients as described above.

Example

A water-based paint composition was prepared by adding the following ingredients to a mixer in the stated order, and mixing them together to form a uniform blend. After all ingredients had been added, the mixing continued for at least ten additional minutes.

| Ingredient | % By Weight | % Solids By Weight |
|---|---|---|
| Aqueous Colloidal Silica (40% Solids) | 29.993 | 11.997 |
| ACRONAL ® NX4627 (aqueous styrene acrylate copolymer, 48% solids) | 5.999 | 2.880 |
| ALMATIS ® A-2 Calcined Alumina (325 mesh, 44 microns diameter aluminum oxide) | 62.984 | 62.984 |
| LOLO Tint 97 (cuprous oxide) | 1.000 | 1.000 |
| KELZAN ® Xanthan Gum | 0.025 | 0.025 |
| TOTAL | 100.00 | 78.886 |

The paint composition was applied to a masonry surface on the side of a building where it was continuously exposed to sun, rain, wind, snow and hot and cold temperatures. After several months, the paint composition showed no signs of fading, peeling, eroding, molding or washing away.

The embodiments of the invention described herein are presently preferred. Various modifications and improvements can be made without departing from the spirit and scope of the invention. The scope of the invention is indicated by the appended claims, and all changes that fall within the meaning and range of equivalents are intended to be embraced therein.

We claim:

1. A paint composition for coating concrete and masonry surfaces, consisting essentially of:
    about 10-50% by weight water;
    about 5-40% by weight colloidal silica particles;
    about 40-85% by weight of an inorganic pigment;
    about 1 to 9% by weight of a polymer binder selected from the group consisting of polymers and copolymers of acrylic, acrylamide, vinyl ethers, vinyl esters, urethanes, methacrylates, and epoxy esters; and
    about 0.1-5% by weight cuprous oxide;
    wherein a sum total of all organic components does not exceed 9% by weight, inclusive of the polymer binder, and the amounts are based on the total weight of the paint composition.

2. The paint composition of claim 1, wherein the colloidal silica particles have a particle size of about 4 to about 100 nanometers.

3. The paint composition of claim 1, wherein the inorganic pigment is selected from the group consisting of aluminum oxide, silicon oxide, titanium dioxide, zinc oxide, iron oxide, graphite, antimony oxide, chromium oxide, cobalt aluminum oxide, zinc sulfide, sodium aluminum sulfosilicates, cuprous oxide, and combinations thereof.

4. The paint composition of claim 1, further comprising about 0.01-2% by weight of a synthetic or natural gum.

5. The paint composition of claim 1, comprising about 10-30% by weight of the colloidal silica particles.

6. The paint composition of claim 1, wherein the composition is substantially free of Group I and Group II metal oxides.

7. The paint composition of claim 1, wherein the polymer binder comprises a styrene-acrylate copolymer.

8. A paint composition for coating concrete and masonry surfaces, consisting essentially of:
    about 15-40% by weight water;
    about 8-25% by weight colloidal silica particles;
    about 40-70% by weight of an inorganic pigment;

about 2-8% by weight of a polymer binder selected from the group consisting of polymers and copolymers of acrylic, acrylamide, vinyl ethers, vinyl esters, urethanes, methacrylates, and epoxy esters; and about 0.1-5% by weight cuprous oxide;

wherein a sum total of all organic components does not exceed 9% by weight, inclusive of the polymer binder, and the amounts are based on the total weight of the paint composition.

9. The paint composition of claim 8, comprising about 0.5-2.5% by weight of the cuprous oxide.

10. The paint composition of claim 8, wherein the polymer binder comprises a styrene acrylate copolymer.

11. The paint composition of claim 8, further comprising about 0.01-1% by weight of a synthetic or natural gum.

* * * * *